Nov. 6, 1928.
J. G. SWAIN
1,690,999
VEHICLE WHEEL
Filed Dec. 11, 1922   2 Sheets-Sheet 1
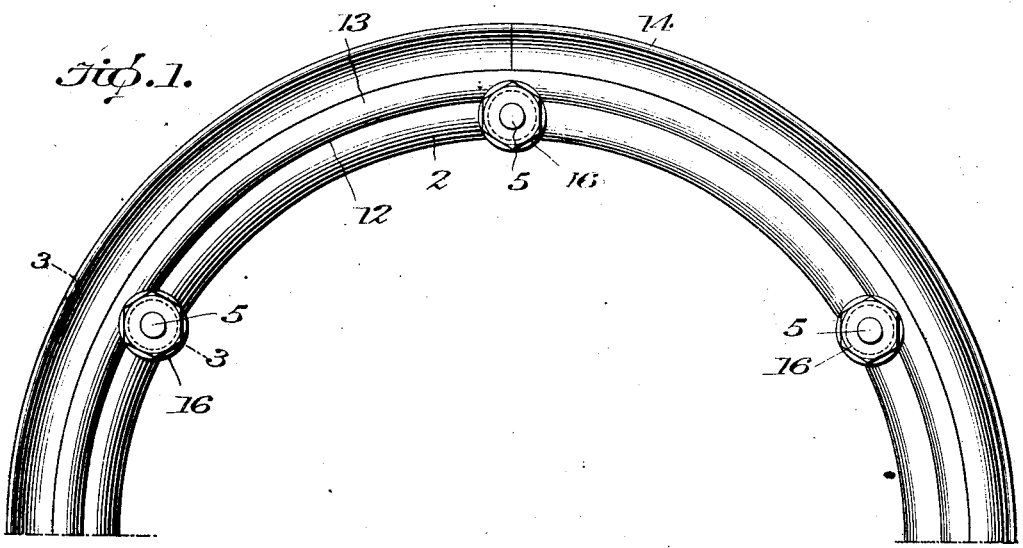
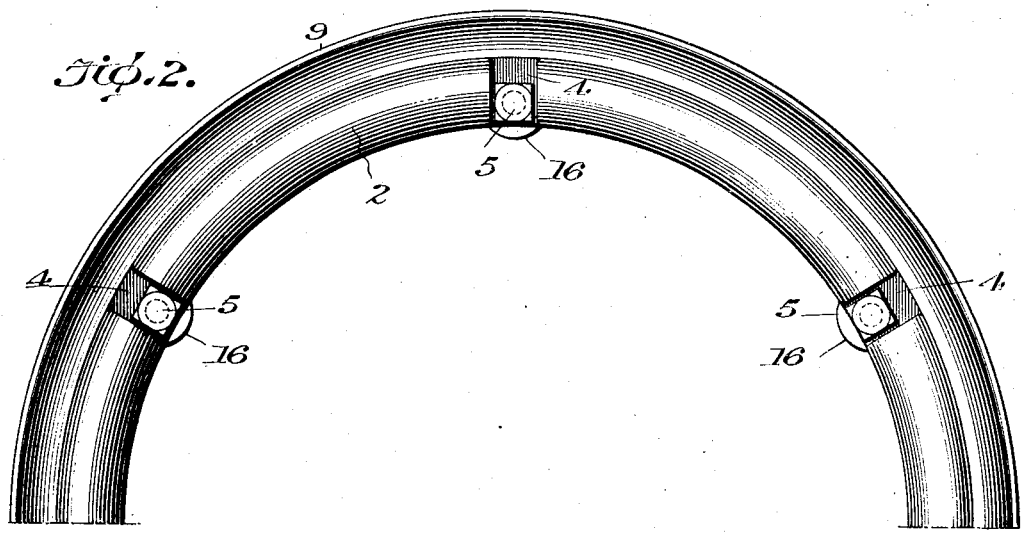
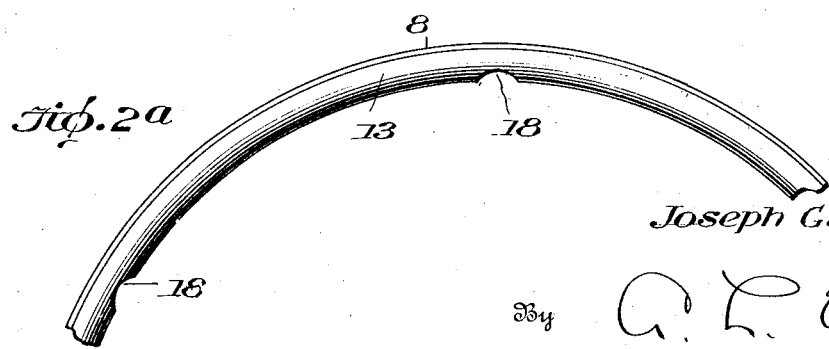
Inventor
Joseph G. Swain
By
Attorney Nov. 6, 1928. 1,690,999
J. G. SWAIN
VEHICLE WHEEL
Filed Dec. 11, 1922 2 Sheets-Sheet 2
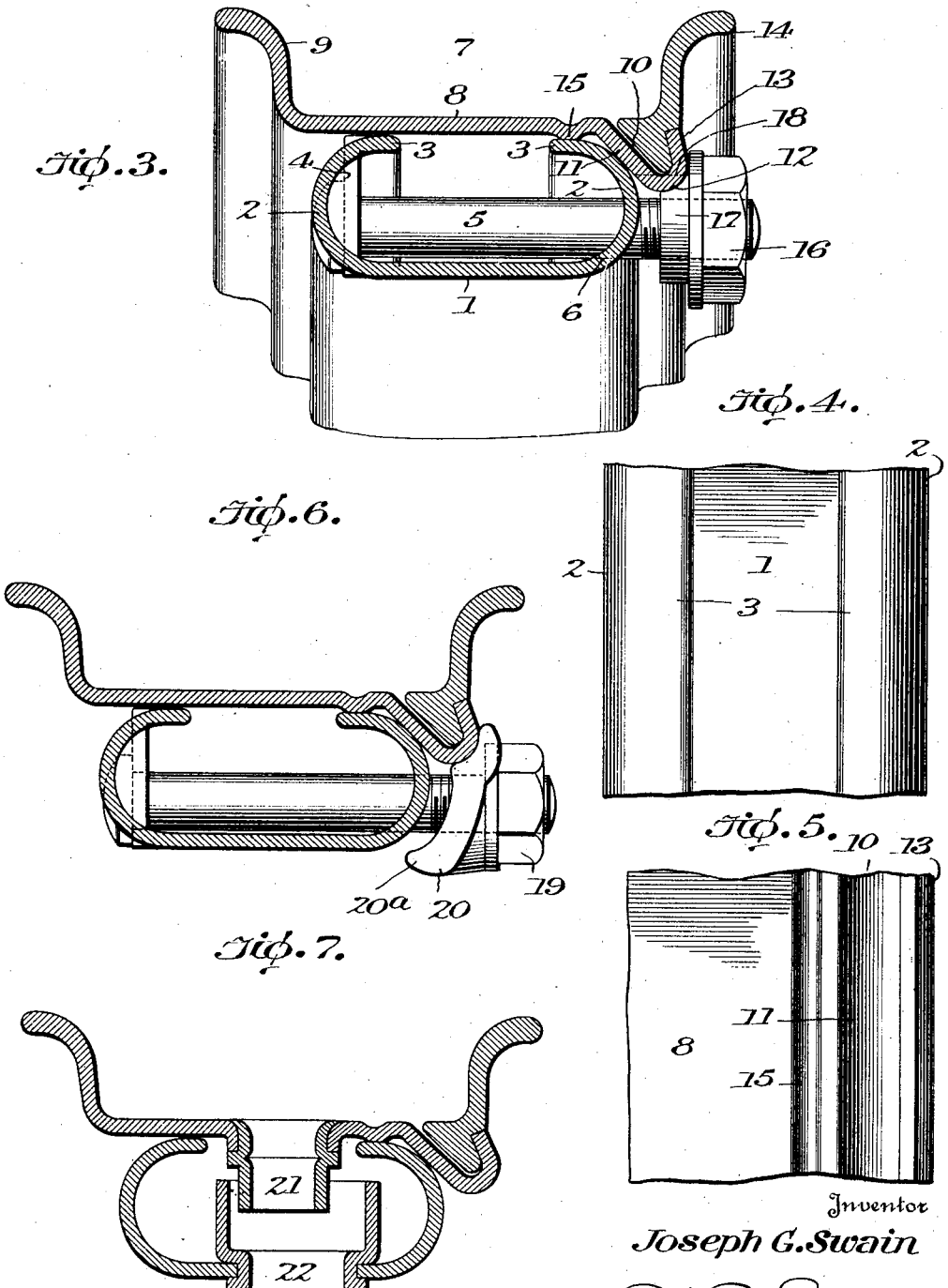
Inventor
Joseph G. Swain Patented Nov. 6, 1928.

1,690,999

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

VEHICLE WHEEL.

Application filed December 11, 1922. Serial No. 606,035.

My invention relates, broadly, to vehicle wheels, and it is concerned particularly with felloe and rim construction for mounting pneumatic tires.

The purpose of my invention, generally speaking, is to provide a practical form of demountable rim and felloe which may be more easily assembled or disassembled than in present wheel constructions, and to provide simplified and more readily positioned locking means, between the felloe and the rim, to secure them together in driving relation.

A particular purpose of my invention is to provide a rim and felloe construction with which the usual form of rim clamp, and driving connection between the rim and the felloe may be used, or not, as desired.

An important purpose of my invention is to provide an exceptionally strong metal felloe having side walls which are so constructed that the usual tying and spacing bolts, or sleeves, are not necessary to prevent them from collapsing under side thrust and other strains.

My invention also comprehends features which permit the rim to be rocked on and off the felloe to loosen and disengage it therefrom with the smallest amount of space being provided, thereby lessening the weight and decreasing the expense of manufacture.

Still another object of my invention is to provide a structure which embodies a light, strong steel felloe without detracting from the appearance of the wheel.

My invention, as illustrated, accomplishes the foregoing, and other results, in connection with straight side, quick detachable rims and felloes therefor, but the principles of my invention are applicable with clincher and other forms of rims, as will presently appear.

Other objects and advantages are also comprehended by my invention as will become apparent when the following description is read and by reference to the accompanying drawings.

In the drawings:

Figure 1 is a side elevational view of a preferred form of my invention showing one-half of a wheel structure, the spokes and hub being omitted;

Figure 2 is a similar view looking at the reverse side of the structure;

Figure 2ª is a fragmentary view of the edge of the demountable rim;

Figure 3 is a transverse sectional view taken on the line 3—3 of Figure 1 and drawn to an enlarged scale;

Figure 4 is a fragmentary plan view of the felloe;

Figure 5 is a similar view of a portion of the rim;

Figure 6 is a transverse sectional view of a modified form of the invention; and Figure 7 is a transverse sectional view showing another feature of the modified form of the invention.

A felloe constructed according to my invention comprises a base portion 1 having integral side walls 2 and it is preferably formed of steel being rolled up from flat or strip steel, thereby decreasing the expense. The base portion 1, viewed in cross-section, is transversely straight and the side walls curve outwardly therefrom, and then inwardly toward each other, over the base portion 1 where they terminate in spaced apart relation and in annular edge portions 3. The edge portions 3 may be cylindrical and in alignment, one side of the felly providing a seat for the demountable tire carrying rim. One side wall is provided with depressed flattened portions therein at intervals which form countersunk sockets 4 adapted to receive the heads of a plurality of threaded square headed bolts 5 and prevent them from turning. The opposite side wall 2 is provided with suitable apertures 6 through which the threaded ends of the bolts 5 project. The bolts 5 and apertures 6 are disposed preferably radially inward of the transverse center of the felloe for a purpose presently apparent.

The type of tire carrying rim 7 which my improved felloe is particularly designed to support comprises a cylindrical base portion 8 which is slightly larger in circumference than the portions 3, and an integral tire retaining flange 9 at one edge thereof. At its opposite edge the base 8 terminates in a gutter portion 10 formed by an oblique annular flange 11, a rounded bottom portion 12 and an upstanding annular flange 13. The gutter portion 10 is designed to seat a removable tire retaining ring 14 which, per se, forms no part of my present invention and, therefore, will not be further described herein.

The oblique flange 11 projects at an obtuse angle from the base 8 toward the axis of the wheel and is designed to engage the outer surface of one side wall 2 of the felloe with a wedging action whereby the rim is held against lateral movement in one direction on the felloe. Adjacent the flange 11 an annular rib 15 is provided upon the inner face of the base portion 8. The rib 15 seats upon the edge portion 3 of the side wall 2 that is engaged by the oblique flange 11. The rib may be formed by rolling a groove in the outer face of the portion 8 or a series of protuberances may be provided in lieu of the rib. By providing the rib 15 for seating the rim upon one edge portion 3 of the felloe, a slight clearance is left between the edge portion 3 of the opposite side wall 2 so that the rim rides upon the substantially double line contact afforded by the gutter 10 and the rib 15. It will be noted that the space between the base of the rim and the outer flanges of the steel felloe is much less than that usually provided in demountable rim constructions to enable the tire carrying rim with the radially projecting valve stem to be rocked off its position on the wheel. By providing the curved outer flange, I am enabled to free the rim from the felloe without the provision of any more space than shown in the drawings. This is an important feature of the invention.

In the preferred form of my invention, I utilize nuts 16 upon the bolts 5 for locking the rim 7 upon the felloe and also holding the rim and felloe against relative circumferential movement. The nuts 16 are sufficiently large to bear against the flange 13 of the gutter portion 10 and by tightening the nuts the flange 11 is forced onto its adjacent felloe wall 2 with a wedging action. A wedging action also occurs between the rib 15 and the outer edge of portion 3 of the wall 2. To prevent circumferential movement of the rim 7 upon the felloe, the nuts 16 are provided with collars 17 which are smaller than the nuts 16 and take into notches 18 in the bottom of the wall 12 of the gutter portion 10.

By means of the foregoing construction a very strong felloe is provided. The curved side walls 2 are exceptionally stiff and no tie bolts or sleeves are needed for spacing the side walls as in other types of felloes. The single combined locking means and driving connection, i. e., the bolts 5 and nuts 16, eliminate the use of clamps and individual driving connections between the rim and felloe. By the construction shown, a minimum number of parts are required to form a satisfactory mounting for the rim and the weight of the wheel is thereby lessened.

However, my invention may be adapted for use with certain forms of clamps and driving connections such as those shown respectively in Figures 6 and 7. In this form of my invention, the notches 18 are preferably omitted and an ordinary nut 19 and clamp 20 are utilized, the clamp engaging the portions 12 and 13 of the gutter 10 to force the rim 7 upon the felloe as in the manner previously described. The tail 20$^a$ of the clamp is bent around as shown so as to give a better appearance to the assembly. With this form of the invention, a driving connection is utilized comprising the usual telescopic sleeves 21 and 22 located respectively upon the rim and felloe.

Other modifications together with numerous structural changes and different arrangements of parts are within the spirit of my invention and such as are within the scope of the appended claims are intended to be comprehended by the present disclosure.

What I claim is:

1. A vehicle wheel comprising, in combination, a hollow metal felloe having rounded side walls and a cylindrical periphery, a removable tire supporting rim provided with an oblique edge flange for engaging one side wall of the felloe with a wedging action when said rim is moved laterally of the felloe in one direction, said flange having spaced notches therein, and means for forcing the rim laterally of the felloe and engaging the notches to prevent relative turning movement of the rim and felloe.

2. A hollow metal felloe for vehicle wheels, said felloe comprising, a flat base portion, and outwardly rounded side walls terminating in spaced apart cylindrical edge portions one side wall being provided with squared sockets therein the opposite side wall being apertured in line with said sockets.

3. A wheel comprising, a sheet metal felloe and a demountable tire carrying rim seated thereon, said metal felloe being provided with inwardly curved rounded flanges one of the flanges being adapted to provide a seat for the demountable rim, bolts passing through the flanges, nuts on the bolts bearing against the tire carrying rim, and an interlocking engagement between the nuts and the rim.

4. A wheel comprising, a sheet metal felloe and a demountable tire carrying rim seated thereon, said metal felloe being provided with an edge flange which is curved throughout, the tire carrying rim having two inwardly extending gutters adapted to seat on the curved surface of the flange.

JOSEPH G. SWAIN.